United States Patent [19]
Liou et al.

[11] Patent Number: 5,856,572
[45] Date of Patent: Jan. 5, 1999

[54] ORGANIC SOLUBLE WHOLLY AROMATIC POLYAMIDES AND PREPARATION OF THE SAME

[75] Inventors: Guey-Sheng Liou, Hsinchu; Sheng-Huei Hsiao; Jen-Chang Yang, both of Taipei, all of Taiwan

[73] Assignee: Industrial Technology Research Institute, Hsinchu, Taiwan

[21] Appl. No.: 696,522

[22] Filed: Aug. 14, 1996

[51] Int. Cl.$^6$ .................................................. C07C 237/52
[52] U.S. Cl. ........................... 564/153; 564/154; 564/156
[58] Field of Search ..................................... 564/153, 154, 564/156

[56] References Cited

U.S. PATENT DOCUMENTS

| | | | |
|---|---|---|---|
| 5,268,487 | 12/1993 | Yang et al. | 548/456 |
| 5,712,409 | 1/1998 | Liou et al. | 560/56 |

*Primary Examiner*—Richard L. Raymond
*Attorney, Agent, or Firm*—Sughrue, Mion, Zinn, Macpeak & Seas, PLLC

[57] ABSTRACT

Disclosed is a wholly aromatic polyamide prepared by reacting 1,4-naphthyl or 2,6-naphthyl containing diacids with aromatic diamines. The polymers of the invention are readily soluble in a variety of organic solvents including DMAc, NMP and pyridine, and have good thermal stability. Transparent, tough and flexible films of these polymers can be cast from the solutions thereof and these polyamides are easily processable high-performance polymer materials.

30 Claims, No Drawings

ORGANIC SOLUBLE WHOLLY AROMATIC POLYAMIDES AND PREPARATION OF THE SAME

BACKGROUND OF THE INVENTION

The present invention relates to organic soluble wholly aromatic polyamides, and in particular to wholly aromatic polyamides prepared by the polycondensation reaction of 1,4-naphthyl or 2,6-naphthyl containing diacids and aromatic diamines.

Wholly aromatic polyamides (aramides) are characterized as highly thermal stable polymers with a favorable balance of physical and chemical properties. However, these polymers are generally intractable and lack the properties essential for successful fabrication into useful forms such as films and fibers due to their high melting or glass transition temperature and their limited solubility in organic solvents. For example, polyamides or polyimides having the structures indicated below generally have high glass transition temperatures ($T_g$) and melting points ($T_m$), and accordingly can not easily be fabricated into films or fibers.

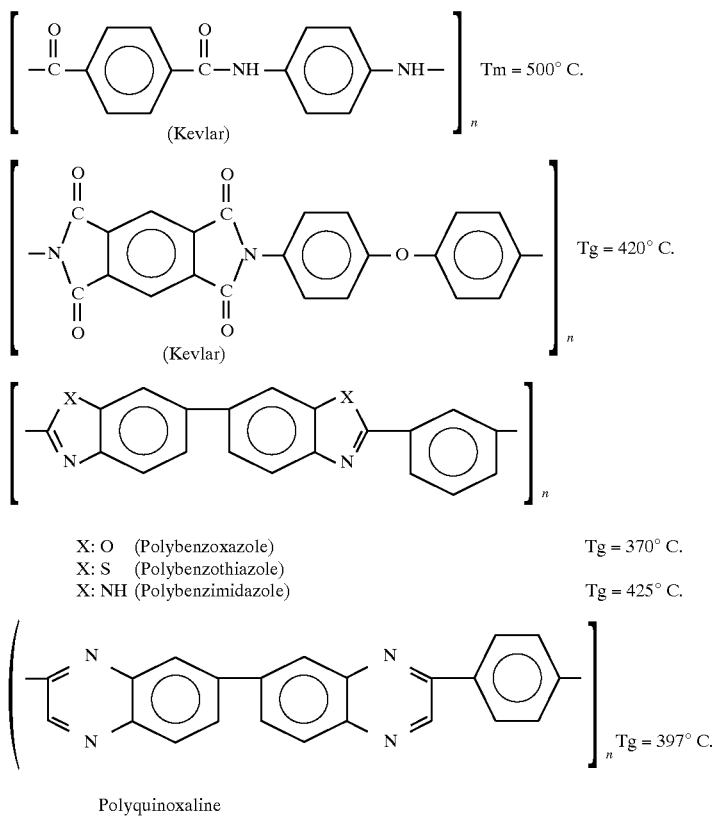

Some melt processable linear polyimides having structures indicated below have been developed.

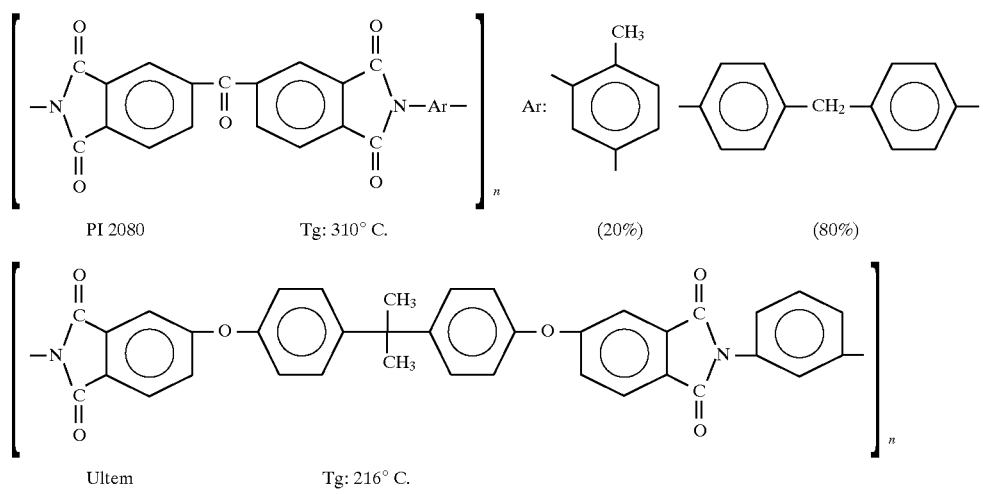

LARC-CPI          Tg: 222° C.

LARC-TPI          Tg: 264° C.

New-TPI           Tg: 270° C.

$$X-\overset{O}{\underset{\|}{C}}-\underset{}{\bigcirc}-O-A_1-O-\underset{}{\bigcirc}-\overset{O}{\underset{\|}{C}}-X \quad (I)$$

These polyimides have superior thermal stability, chemical resistance, dimension stability, mechanical properties and electrical properties. However, their solubility in organic solvents is still low and accordingly they are not suitable for being fabricated into films or fibers.

SUMMARY OF THE INVENTION

It is therefore an object of the invention to provide wholly aromatic polyamides which are readily soluble in various organic solvents and have good thermal stability. Transparent, tough and flexible films of these polymers can be cast from the solutions thereof and these polyamides are easily processable high performance polymer materials.

It has been found by the inventors that introduction of bulky and symmetrical 1,4-naphthyl or 2,6-naphthyl units containing ether linkage into a polyamide backbone can attain the above object.

The soluble wholly aromatic polyamides of the invention are obtained by reacting 1,4-naphthyl or 2,6-naphthyl containing diacids or their derivatives with aromatic diamines. Specifically, the 1,4-naphthyl or 2,6-naphthyl diacids or their derivatives are compounds having the structure of formula (I):

$$X-\overset{O}{\underset{\|}{C}}-\underset{}{\bigcirc}-O-Ar_1-O-\underset{}{\bigcirc}-\overset{O}{\underset{\|}{C}}-X \quad (I)$$

wherein X represents CL, OH or OR wherein R is a $C_1$–$C_6$ alkyl and $Ar_1$ represents:

[2,6-naphthyl] or [1,4-naphthyl]

Suitable aromatic diamines used in the present invention have the following formula:

$$H_2N-Ar_2-NH_2$$

wherein $Ar_2$ represents aromatic radicals such as the following:

(a) —⟨phenyl⟩—

(b) —⟨phenyl⟩—

(c) —⟨phenyl⟩—⟨phenyl⟩—

(d) —⟨phenyl⟩—O—⟨phenyl⟩—

(e) —⟨phenyl⟩—O—⟨phenyl⟩—

-continued

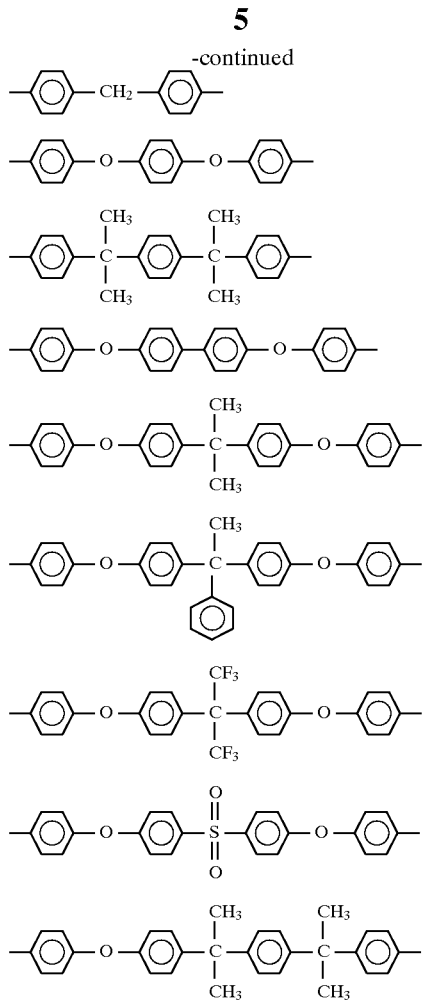

The wholly aromatic polyamides of the present invention have the following formula:

$$\left[ \begin{array}{c} O \\ \parallel \\ C \end{array} - \bigcirc - O - Ar_1 - O - \bigcirc - \begin{array}{c} O \\ \parallel \\ C \end{array} - \begin{array}{c} H \\ \mid \\ N \end{array} - Ar_2 - \begin{array}{c} H \\ \mid \\ N \end{array} \right]_n \quad (II)$$

wherein $Ar_1$ and $Ar_2$ are defined as above and n is an integer of 1–300.

The raw materials, diacids of the present invention can be prepared by the following reaction schemes:

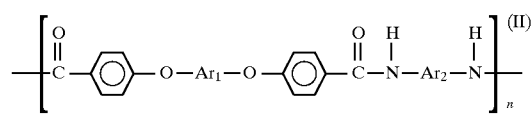

2,6-NCN

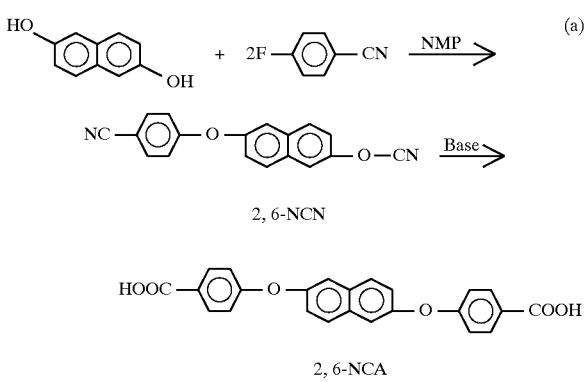

2,6-NCA

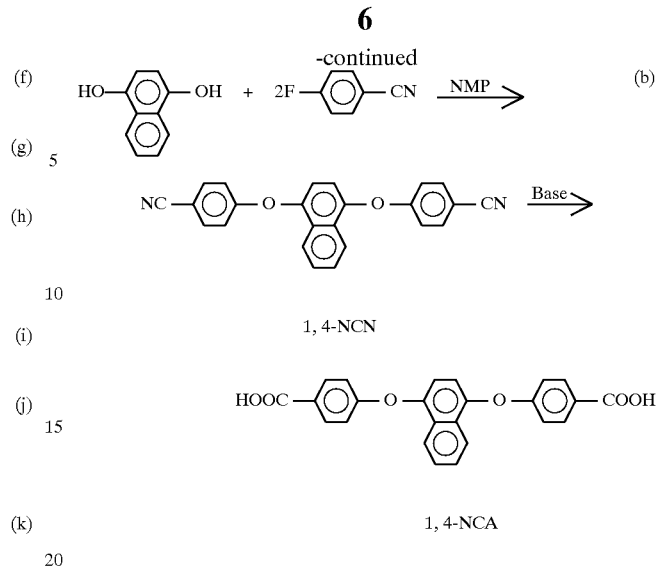

1,4-NCN 1,4-NCA

Examples of the aromatic diamines include p-Phenylenediamine (3a), m-phenylenediamine (3b), benzidine (3c), 4,4'oxydianiline (3d), 3,4'-oxydianiline (3e), 4,4'-diaminodiphenyl methane (3f), 1,4-bis(p-aminophenoxy)benzene (3g), α,α-bis (p-aminophenyl)-1,4-diisopropylbenzene (3h), 4,4'-bis(p-aminophenoxy)biphenyl (3i), 2,2'-bis[p-(p-aminophenoxy)phenylpropane (3j), 1,1'-bis[p-(p-aminophenoxy)phenyl]-1-phenylethane (3k), 2,2'-bis[p-(p-aminophenoxy)phenyl] hexafluoropropane (3l), bis[p-(p-aminophenoxy0phenyl] sulfone (3m), and α,α-bis [p-(p-aminophenoxy)1,4-diisopropylbenzene (3n). Note that according to the present invention, diamines, (3a) and (3b) should be purified by distilllation before use while diamines (3c), (3d), (3e) (3f) and (3g) can be used as received. Diamines (3h), (3i), (3j), (3k) (3l), (3m) and (3n) are prepared by aromatic nucleophilic substitution reaction of the corresponding bisphenols and p-chloronitrobenzene in the presence of potassium carbonate, yilding dinitro compounds and subsequent reduction using hydraxine as reducing agent and palladium as catalyst (K. Suematsu, *Micromolecules,* 18, 2083 (1985).

The present invention is more specifically described by the following non-limiting examples.

PREPARATIVE EXAMPLE 1

Preparation of 1,4-Bis(p-carboxylphenoxy)naphthyl (1,4-NCA)

In a three-neck flask fitted with a nitrogen inlet, a Dean-StarK trap and a condensor, were placed 16.02 g (100 mmole) of 1,4-naphthalenediol and 27.64 g (200 mmole) with 100 mL of toluene and 200 mL of NMP. The mixture was heated and stirred at 140° C. for 6 hours under nitrogen to facilitate dehydration. After the toluene was removed, the mixtute was cooled and then 24.22 g (200 mmol) of p-fluorobenxonitrile was added. The reaction was carried out at 170° C. for 10 hours and then the reaction mixture was allowed to cool and poured into 3 L of cool water. The product was filtrated and recrystallized from acetonitrile to provide 21.75 g (60% yield) of 1,4-Bis(p-cyanophenoxy) naphthyl (1,4-NCN) in white needles, mp 197°–198° C. The IR spectrum (KBr) exhibited absorption (C≡N) at 2228 $cm^{-1}$ and (C—O—C) at 1108 and 1236 $cm^{-1}$. ANAL. Calcd. for $C_{24}H_{14}N_2O_2$: C, 79.54%; H, 3.89%; N. 7.73%; Found: C, 79.26%; H,4.08%; N, 7.61%.

The obtained 1,4-NCN was then hydrolyzed in potassium hydroxide solution until no further ammonia was generated. The solution was cooled, and the pH value was adjusted by hydrochloric acid to near 3. A white precipitate of 1,4-NCA was formed and collected by filtrating and drying under vacuum. The yield was 100%. The melting point of the obtained white powder was 354°–355° C. without purification. The IR spectrum (KBr) exhibited an absorption at 1680 cm$^{-1}$ (C=O).

PREPARATIVE EXAMPLE 2

Preparation of 2,6-Bis(p-carboxylphenoxy)naphthyl (2,6-NCA)

In a three-neck flask fitted with a nitrogen inlet, a Dean-StarK trap and a condenser, were placed 16.02 g (100 mmole) of 2,6-naphthalenediol and 27.64 g (200 mmole) with 100 mL of toluene and 200 mL of NMP. The mixture was heated and stirred at 140° C. for 6 hours under nitrogen to facilitate dehydration. After the toluene had been removed, the mixtute was cooled and then 24.22 g (200 mmol) of p-fluorobenxonitrile was added. The reaction was carried out at 170° C. for 10 hours and then the reaction mixture was allowed to cool and poured into 3 L of cool water. The product was filtrated and recrystallized from acetonitrile to provide 21.75 g (60% yield) of 2,6-Bis(p-cyanophenoxy)naphthyl (2,6-NCN) in white needles, mp 252.2° C. The IR spectrum (KBr) exhibited absorption (C≡N) at 2228 cm$^{-1}$ and (C—O—C) at 1108 and 1236 cm$^{-1}$. ANAL. Calcd. for $C_{24}H_{14}N_2O_2$; C, 79.54%; H, 3.89%; N, 7.73%; Found: C, 79.26%; H,4.08%; N, 7.61%.

The obtained 2,6-NCN was then hydrolyzed in potassium hydroxide solution until no further ammonia was generated. The solution was cooled, and the pH value was adjusted by hydrochloric acid to near 3. A white precipitate of 2,6-NCA was formed and was collected by filtrating and drying under vacuum. The yield was 100%. The melting point of the obtained white powder was 352.3° C. without purification. The IR spectrum (Kbr) exhibited an absorption at 1680 cm$^{-1}$ (C=O).

EXAMPLE 1

Preparation of wholly aromatic polyamide (5d) of the invention

A mixture of 0.25 g (1.25 mmole) of 4,4'-oxydianiline (4d), 0.50 g (1.25 mmole) of 1,4-NCA (prepared from preparative Example 1), 0.5 g of calcium chloride, 5 ml of NMP, 1 mL of pyridine, and 0.9 mL of triphenyl phosphite was heated at 100° C. for 3 hours. The obtained polymer solution was trickled into 300 mL of methanol, collected by filtration and dried at 100° C. under vacuum. The inherent viscosity of the polymer obtained was 2.22 dL/g, measured at a concentration of 0.5 g/dL in DMAc containing 5 wt % LiCL at 30° C. The $T_g$ was 240° C. measured from the second heating trace of DSC conducted at a heating rate of 20° C./min in $N_2$. Other properties are described in Table 2

EXAMPLES 2–14

Preparations of wholly aromatic polyamides 5a–5c and 5e–5n of the invention.

The same procedures of Example 1 were followed except that aromatic diamines 4a–4c and 4e–4n were used. The inherent viscosities $\eta_{inh}$ and $T_g$ of the obtained polymers were measured and shown in Table 1.

TABLE 1

| NO. | $\eta_{inh}$(dl/g) | $T_g$(°C.) |
| --- | --- | --- |
| 5a | 1.40 | — |
| 5b | 1.34 | 204 |
| 5c | 1.68 | — |
| 5d | 2.22 | 240 |
| 5e | 1.42 | 233 |
| 5d | 1.40 | 220 |
| 5g | 1.52 | 220 |
| 5h | 1.28 | 145 |
| 5I | 1.30 | 213 |
| 5j | 1.86 | 213 |
| 5k | 1.32 | 227 |
| 5l | 1.58 | 216 |
| 5m | 1.27 | 220 |
| 5n | 1.70 | 213 |

In addition, the solubilities and tensil properties of the polymers obtained from Example 1–14 were measured and shown in Table 2 below.

TABLE 2

| | Solubility[a] | | | | | | Tensile Properties[b] | | |
| --- | --- | --- | --- | --- | --- | --- | --- | --- | --- |
| | Solvent | | | | | | Tensile | Elongation | Tensile |
| polymer code | NMP | DMAc | DMF | DMSO | m- | THF | strength (MPa) | to break (%) | modulus (GPa) |
| 5a | − | − | − | − | − | − | –[c] | − | − |
| 5b | + | + | + | + | + | − | 84 | 10 | 1.91 |
| 5c | − | − | − | − | − | − | –[c] | − | − |
| 5d | + | + | + | + | + | − | –[c] | − | − |
| 5e | + | + | + | + | + | − | 82 | 8 | 1.72 |
| 5f | + | + | + | + | + | − | 64 | 8 | 1.38 |
| 5g | + | ± | − | − | − | − | .86 | 8 | 1.90 |
| 5h | + | + | ± | s | + | s | 83 | 9 | 1.61 |
| 5i | + | + | − | − | − | − | 73 | 7 | 1.64 |
| 5j | + | + | ± | ± | + | s | 104 | 9 | 2.14 |
| 5k | + | + | s | s | + | +h | 70 | 7 | 1.64 |
| 5l | + | + | + | + | + | + | 71 | 8 | 1.52 |
| 5m | + | + | s | s | + | + | 74 | 8 | 1.66 |
| 5n | + | + | +h | +h | + | s | 65 | 6 | 1.54 |

[a]+: soluble, +h: soluble on heating, ±: partially soluble, s: swelling, −: insoluble
[b]Films were cast from slow evaporation of polymer solution in DMAc.
[c]No available samples could be obtained.

EXAMPLE 15

Preparation of wholly aromatic polyamide (4d) of the invention

A mixture of 0.25 g (1.25 mmole) of 4,4'-oxydianiline (4d), 0.50 g (1.25 mmole) of 2,6-NCA (prepared from preparative Example 2), 0.5 g of calcium chloride, 5 ml of NMP, 1 mL of pyridine, and 0.9 mL of triphenyl phosphite was heated at 100° C. for 3 hours. The obtained polymer solution was trickled into 300 mL of methanol, collected by filtration and dried at 100° C. under vacuum. The inherent viscosity, $T_g$ and tensile properties of the polymer (4d) obtained were measured and described in Table 3 and Table 4.

EXAMPLES 16–29

Preparations of wholly aromatic polyamides 4a–4c and 4e–4n of the invention.

The same procedures of Example 15 were followed except that aromatic diamines 4a–4c and 4e–4n were used. The inherent viscosities $\eta_{inh}$ and $T_g$ and tensile properties of the obtained polymers were measured and shown in Table 3 and Table 4.

TABLE 3

| No. | NMP(ml) | Py(ml) | CaCl$_2$(g) | $\eta_{inh}{}^{d)}$ (dl/g) in DMAc-5% LiCl | in H$_2$SO$_4{}^{f)}$ |
|---|---|---|---|---|---|
| 4a | 10 | 2.5 | 0.6(+0.6 gLiCl) | 1.43 | 1.34 |
| 4b | 5 | 1.3 | 0.6 | 0.31 | 1.27 |
| 4c | 10 + 5$^{b)}$ | 2.5 | 0.9 | —$^{e)}$ | 0.64 |
| 4d | 4 + 4$^{c)}$ | 1.0 | 0.5 | 2.19 | 1.80 |
| 4e | 4 | 1.0 | 0.5 | 1.50 | 0.73 |
| 4f | 4 + 2$^{c)}$ | 1.0 | 0.5 | 1.47 | 1.22 |
| 4g | 5 + 2$^{c)}$ | 1.3 | 0.6 | 1.56 | 1.43 |
| 4h | 5 | 1.3 | 0.6 | 1.30 | 0.07 |
| 4i | 5 + 15$^{b)}$ | 1.3 | 0.6(+0.5 gLiCl) | —$^{e)}$ | 1.34 |
| 4j | 5 | 1.3 | 0.6 | 1.64 | 0.06 |
| 4k | 5 + 2$^{c)}$ | 1.3 | 0.6 | 1.39 | 0.10 |
| 4l | 5 + 4$^{c)}$ | 1.3 | 0.6 | 1.72 | 1.71 |
| 4m | 5 + 2$^{c)}$ | 1.3 | 0.6 | 1.39 | 1.53 |
| 4n | 5 + 4$^{c)}$ | 1.3 | 0.6 | 1.71 | 0.06 |

$^{a)}$Amount of each diacid and diamine monomer = 1.25 mmole, TPP = 0.9 ml (2.5 mmole), reaction temperature = 110° C., reaction time = 3 hr.
$^{b)}$The polymer precipitated during the reaction and could not be redissolved by further addition of NMP.
$^{c)}$An initial amount of NMP was used and an additional amount of NMP was supplemented when the reaction was too viscous to stir.
$^{d)}$Measured at a concentration of 0.5 g/dl at 30° C.
$^{e)}$Insoluble
$^{f)}$Determined as soon as the solid was dissolved completely at room temperature.

TABLE 4

| Polymer code | Tensile properties of polyamide films$^{a)}$ | | | DSC data | |
|---|---|---|---|---|---|
| | Tensile strength (MPa) | Elongation to break (%) | Tensile modulus (GPa) | $T_g{}^{b)}$ (°C.) | $T_m{}^{c)}$ (°C.) |
| 4a | —$^{d)}$ | — | — | 222 | 465 |
| 4b | 91 | 6 | 2.23 | 218 | 364 |
| 4c | —$^{d)}$ | — | — | 295 | |
| 4d | —$^{d)}$ | — | — | 230 | 430 |
| 4e | 88 | 9 | 2.30 | 195 | 267 |
| 4f | 90 | 28 | 2.16 | 247 | 420 |
| 4g | —$^{d)}$ | — | — | 222 | 423 |
| 4h | 80 | 8 | 2.12 | 205 | |
| 4i | —$^{d)}$ | — | — | 265 | 438 |
| 4j | 74 | 11 | 1.03 | 216 | |

TABLE 4-continued

| Polymer code | Tensile properties of polyamide films$^{a)}$ | | | DSC data | |
|---|---|---|---|---|---|
| | Tensile strength (MPa) | Elongation to break (%) | Tensile modulus (GPa) | $T_g{}^{b)}$ (°C.) | $T_m{}^{c)}$ (°C.) |
| 4k | 74 | 17 | 1.35 | 208 | |
| 4l | 70 | 21 | 1.75 | 203 | |
| 4m | 72 | 16 | 1.78 | 235 | |
| 4n | 82 | 10 | 1.93 | 197 | |

$^{a)}$Films were cast by slow evaporation of polymer solutions in DMAc.
$^{b)}$Temperatures at the midpoint of 20° C./min in nitrogen.
$^{c)}$Sharp endotherms appeared in the first DSC heating traces before 480° C.
$^{d)}$No available specimens could be obtained.

As can be seen from Tables 1–4, aramids of the present invention are successfully obtained in almost quantitative yield with inherent viscosities of 1.27–2.22 DL/g, and all the molecular weight of these polymers are sufficiently high to permit casting tough and flexible films. In addtion, the solubility behavior of these aramids are highly soluble in polar solvents such as DMAc, NMP, m-cresol and even in less polar pyridine. The glass transition temperatures (Tg) of these polymers are observed to be in the range of 195°–240° C., depending on the structure of diamines component, and decreased with decreasing rigidity and symmetry of the polymer backbone. All these polymers are stable up to 400° C. in both air and nitrogen atmospheres, and the temperatures at 10% weight loss are above 480° C. on the TG curves. The solution cast films of these polymers from NMP solutions have superior crystallinity and mechanical properties.

We claim:

1. A wholly aromatic polyamide of the formula:

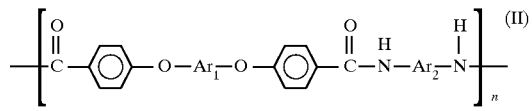

wherein Ar$_1$ is

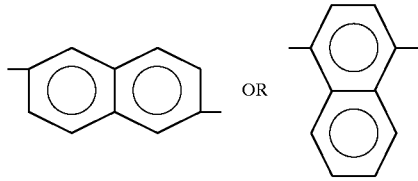

Ar$_2$ is an aromatic group selected from the group consisting of the following:

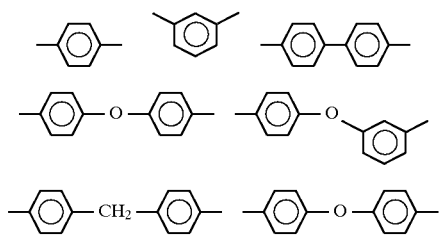

-continued

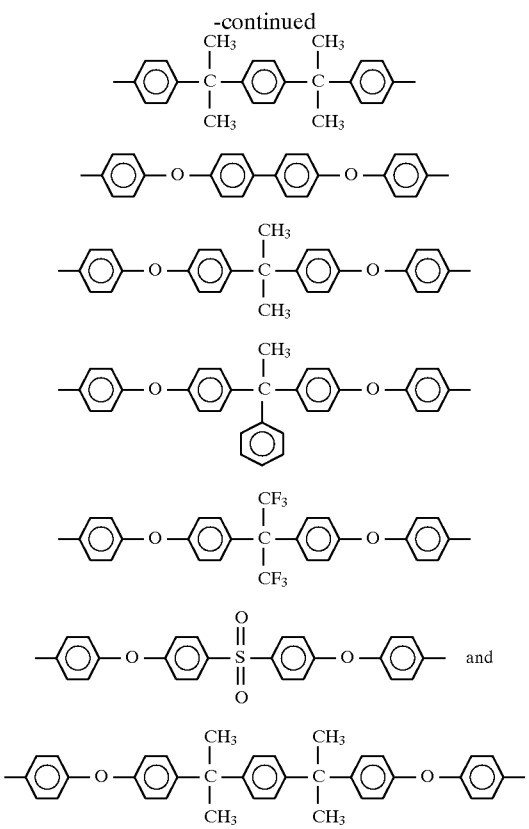

and n is an integer of 1–300.

2. The wholly aromatic polyamide of claim 1, wherein $Ar_1$ is

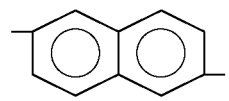

and $Ar_2$ is

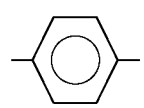.

3. The wholly aromatic polyamide of claim 1, wherein $Ar_1$ is

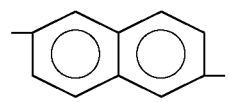

and $Ar_2$ is

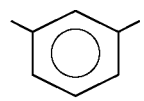.

4. The wholly aromatic polyamide of claim 1, wherein $Ar_1$ is

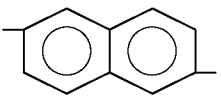

and $Ar_2$ is

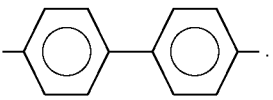.

5. The wholly aromatic polyamide of claim 1, wherein $Ar_1$ is

and $Ar_2$ is

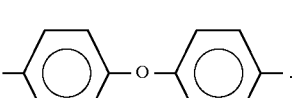.

6. The wholly aromatic polyamide of claim 1, wherein $Ar_1$ is

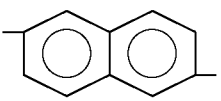

and $Ar_2$ is

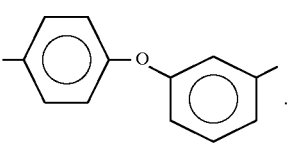.

7. The wholly aromatic polyamide of claim 1, wherein $Ar_1$ is

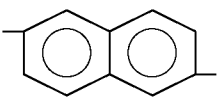

and $Ar_2$ is

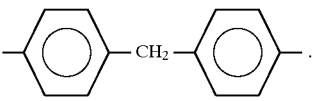.

8. The wholly aromatic polyamide of claim 1, wherein Ar$_1$ is

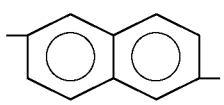

Ar$_2$ is

9. The wholly aromatic polyamide of claim 1, wherein Ar$_1$ is

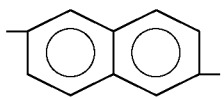

and Ar$_2$ is

10. The wholly aromatic polyamide of claim 1, wherein Ar$_1$ is

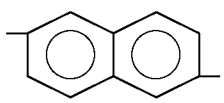

and Ar$_2$ is

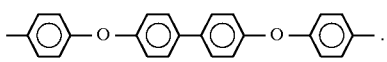

11. The wholly aromatic polyamide of claim 1, wherein Ar$_1$ is

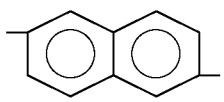

and Ar$_2$ is

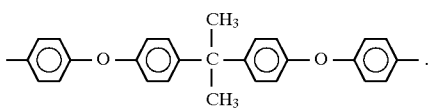

12. The wholly aromatic polyamide of claim 1, wherein Ar$_1$ is

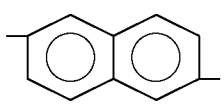

and Ar$_2$ is

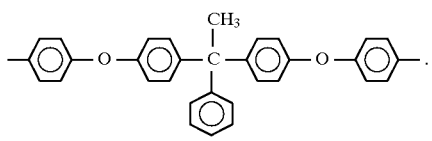

(k)

13. The wholly aromatic polyamide of claim 1, wherein Ar$_1$ is

and Ar$_2$ is

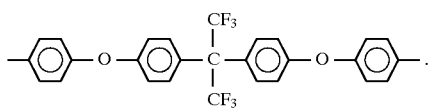

14. The wholly aromatic polyamide of claim 1, wherein Ar$_1$ is

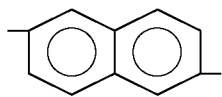

and Ar$_2$ is

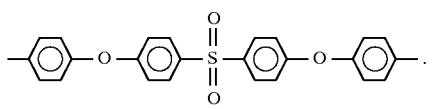

15. The wholly aromatic polyamide of claim 1, wherein Ar$_1$ is

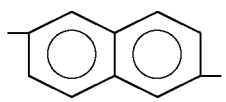

and Ar$_2$ is

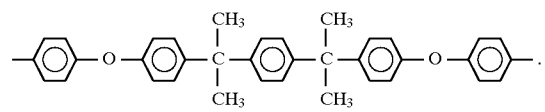

16. The wholly aromatic polyamide of claim 1, wherein Ar$_1$ is

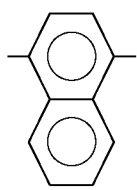

and Ar₂ is

17. The wholly aromatic polyamide of claim 1, wherein Ar₁ is

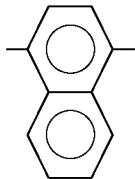

and Ar₂ is

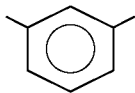

18. The wholly aromatic polyamide of claim 1, wherein Ar₁ is

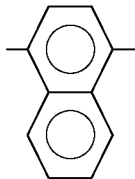

and Ar₂ is

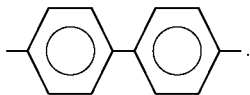

19. The wholly aromatic polyamide of claim 1, wherein Ar₁ is

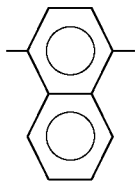

and Ar₂ is

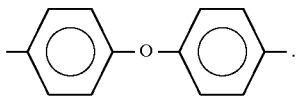

20. The wholly aromatic polyamide of claim 1, wherein Ar₁ is

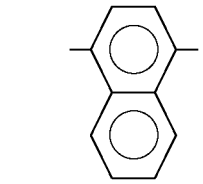

and Ar₂ is

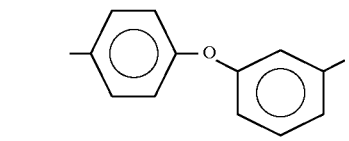

21. The wholly aromatic polyamide of claim 1, wherein Ar₁ is

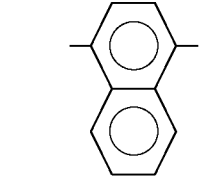

and Ar₂ is

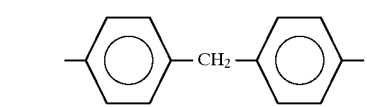

22. The wholly aromatic polyamide of claim 1, wherein Ar₁ is

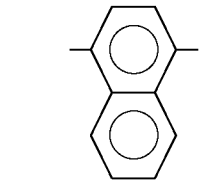

and Ar₂ is

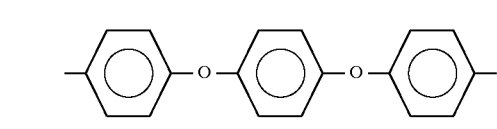

23. The wholly aromatic polyamide of claim 1, wherein Ar$_1$ is

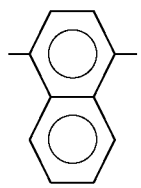

and Ar$_2$ is

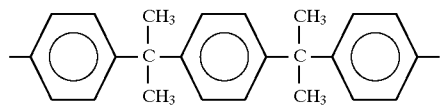

24. The wholly aromatic polyamide of claim 1, wherein Ar$_1$ is

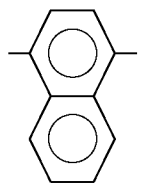

and Ar$_2$ is

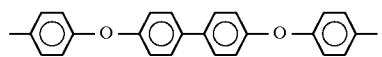

25. The wholly aromatic polyamide of claim 1, wherein Ar$_1$ is

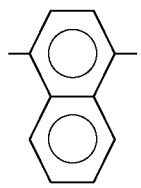

and Ar$_2$ is

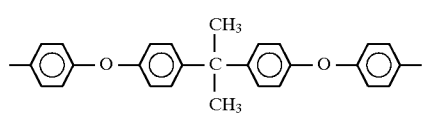

26. The wholly aromatic polyamide of claim 1, wherein Ar$_1$ is

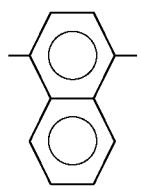

and Ar$_2$ is

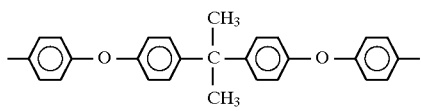

27. The wholly aromatic polyamide of claim 1, wherein Ar$_1$ is

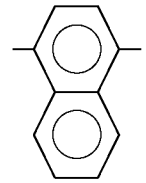

and Ar$_2$ is

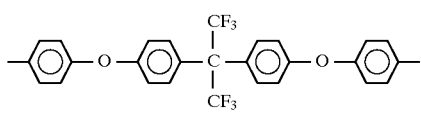

28. The wholly aromatic polyamide of claim 1, wherein Ar$_1$ is

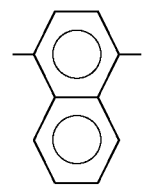

and Ar$_2$ is

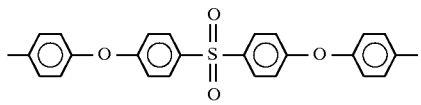

29. The wholly aromatic polyamide of claim 1, wherein Ar$_1$ is

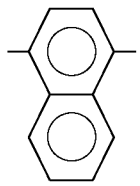

and Ar₂ is

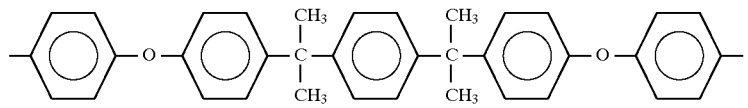

30. A process for preparing a wholly aromatic polyamide of the formula:

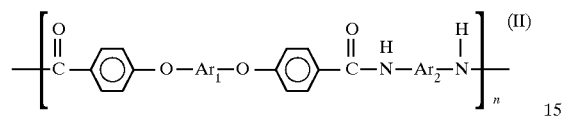

wherein Ar₁ is

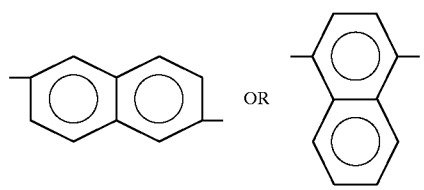

and Ar₂ is

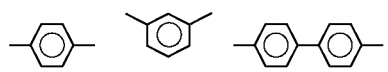

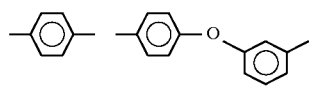

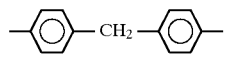

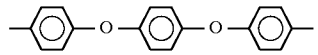

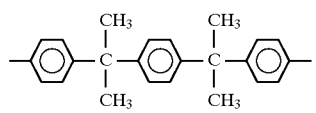

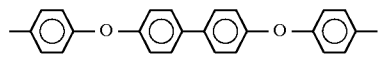

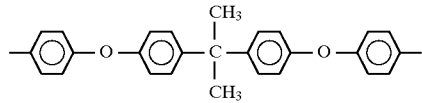

-continued

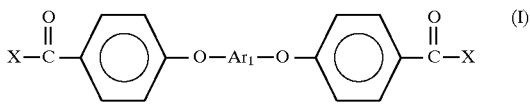

and n is an integer of 1 to 300, comprising reacting a diacid of formula (I)

$$X-\overset{O}{\underset{\|}{C}}-\text{Ph}-O-Ar_1-O-\text{Ph}-\overset{O}{\underset{\|}{C}}-X \qquad (I)$$

wherein Ar₁ is defined as above and X is Cl, OH or OR wherein R is a C₁–C₆ alkyl with an aromatic diamine of formula (III)

$$H_2N—Ar_2—NH_2 \qquad (III)$$

wherein Ar₂ is defined as above.

* * * * *